United States Patent [19]
Gudat et al.

[11] Patent Number: 5,991,694
[45] Date of Patent: Nov. 23, 1999

[54] METHOD AND APPARATUS FOR DETERMINING THE LOCATION OF SEEDLINGS DURING AGRICULTURAL PRODUCTION

[75] Inventors: Adam J. Gudat, Edelstein; Gregory R. Harrod, Peoria; Stephen Colburn, Eureka, all of Ill.

[73] Assignee: Caterpillar Inc., Peoria, Ill.

[21] Appl. No.: 09/075,900

[22] Filed: May 11, 1998

Related U.S. Application Data

[63] Continuation-in-part of application No. 08/556,343, Nov. 13, 1995, abandoned.

[51] Int. Cl.⁶ .............................. A01D 45/00; G01C 21/00
[52] U.S. Cl. ................................ 702/2; 702/5; 701/50; 701/213; 56/10.2 A
[58] Field of Search ............................ 701/50, 208, 213, 701/215, 2, 5; 342/357, 457; 340/988, 995; 180/167; 111/200; 172/2; 56/10.2 R, 10.2 A

[56] References Cited

U.S. PATENT DOCUMENTS

| | | | |
|---|---|---|---|
| 4,677,555 | 6/1987 | Goyet | 364/424.07 |
| 4,807,131 | 2/1989 | Clegg | 364/424.07 |
| 4,820,041 | 4/1989 | Davidson et al. | 364/424.07 |
| 5,187,663 | 2/1993 | Kamimura et al. | 180/167 |
| 5,220,876 | 6/1993 | Monson et al. | 111/130 |
| 5,260,875 | 11/1993 | Tofte et al. | 364/424.07 |
| 5,334,987 | 8/1994 | Teach | 342/357 |
| 5,438,771 | 8/1995 | Sahm et al. | 364/424.07 |
| 5,438,817 | 8/1995 | Nakamura | 56/10.2 A |
| 5,467,271 | 11/1995 | Abel et al. | 364/420 |
| 5,477,459 | 12/1995 | Clegg et al. | 364/424.07 |
| 5,528,518 | 6/1996 | Bradshaw et al. | 364/449.2 |
| 5,557,524 | 9/1996 | Maki | 364/449.7 |
| 5,596,500 | 1/1997 | Sprague et al. | 364/449.7 |
| 5,598,339 | 1/1997 | Yoshihara et al. | 364/449.7 |
| 5,606,850 | 3/1997 | Nakamura | 56/10.2 A |
| 5,612,864 | 3/1997 | Henderson | 354/424.07 |
| 5,666,793 | 9/1997 | Bottinger | 56/10.2 R |
| 5,668,719 | 9/1997 | Bobrov et al. | 364/420 |

FOREIGN PATENT DOCUMENTS

| | | |
|---|---|---|
| 4322293A1 | 1/1995 | Germany . |
| 95/02318 | 1/1995 | WIPO . |
| 9515499 | 6/1995 | WIPO . |
| 95/18432 | 7/1995 | WIPO . |

*Primary Examiner*—Eric W. Stamber
*Attorney, Agent, or Firm*—William Byran McPherson, III; Steven G. Kibby; James R. Yee

[57] ABSTRACT

In one aspect of the present invention, an apparatus for determining the location of rows of seedlings planted during agricultural production is provided. The apparatus senses the position of a planting machine 102 during a planting operation. The apparatus transforms the planting machine position to seedling row locations and creates a database of the locations.

In another aspect of the present invention, a method for determining the location of row of seedlings planted during agricultural production is provided. The method includes the steps of planting seedlings using a planting machine, sensing the position the planting machine and transforming the machine position to seedling row locations.

21 Claims, 14 Drawing Sheets

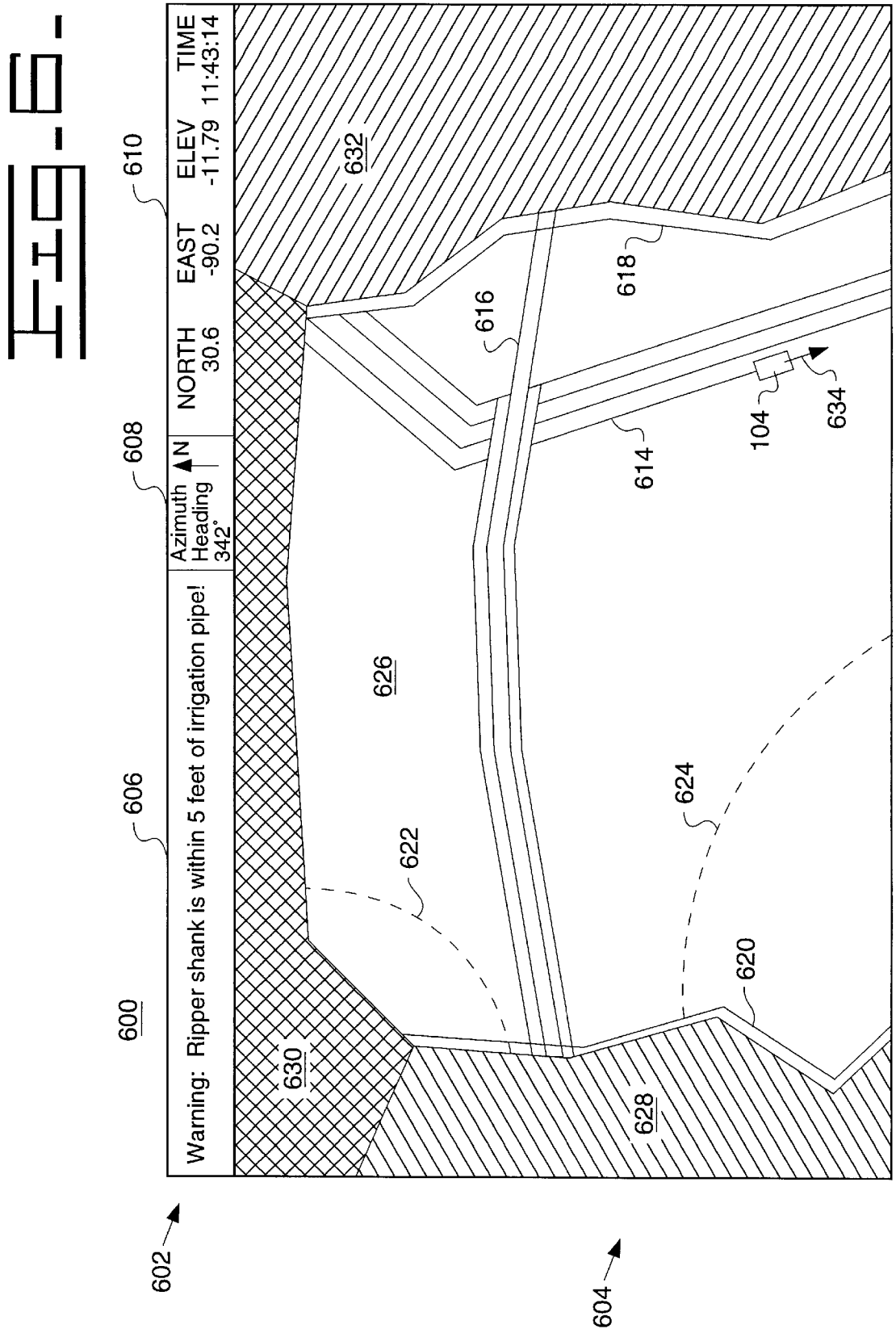

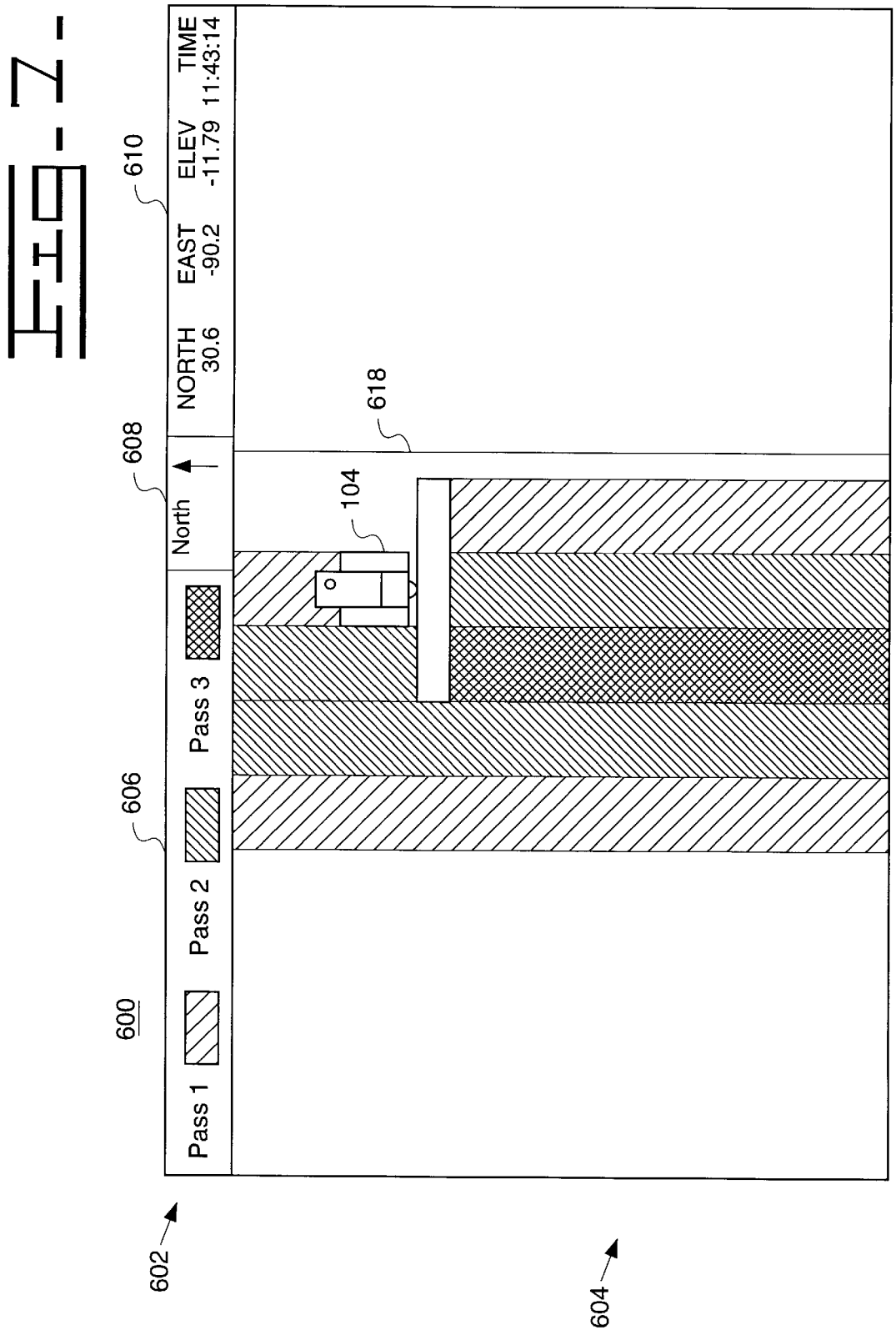

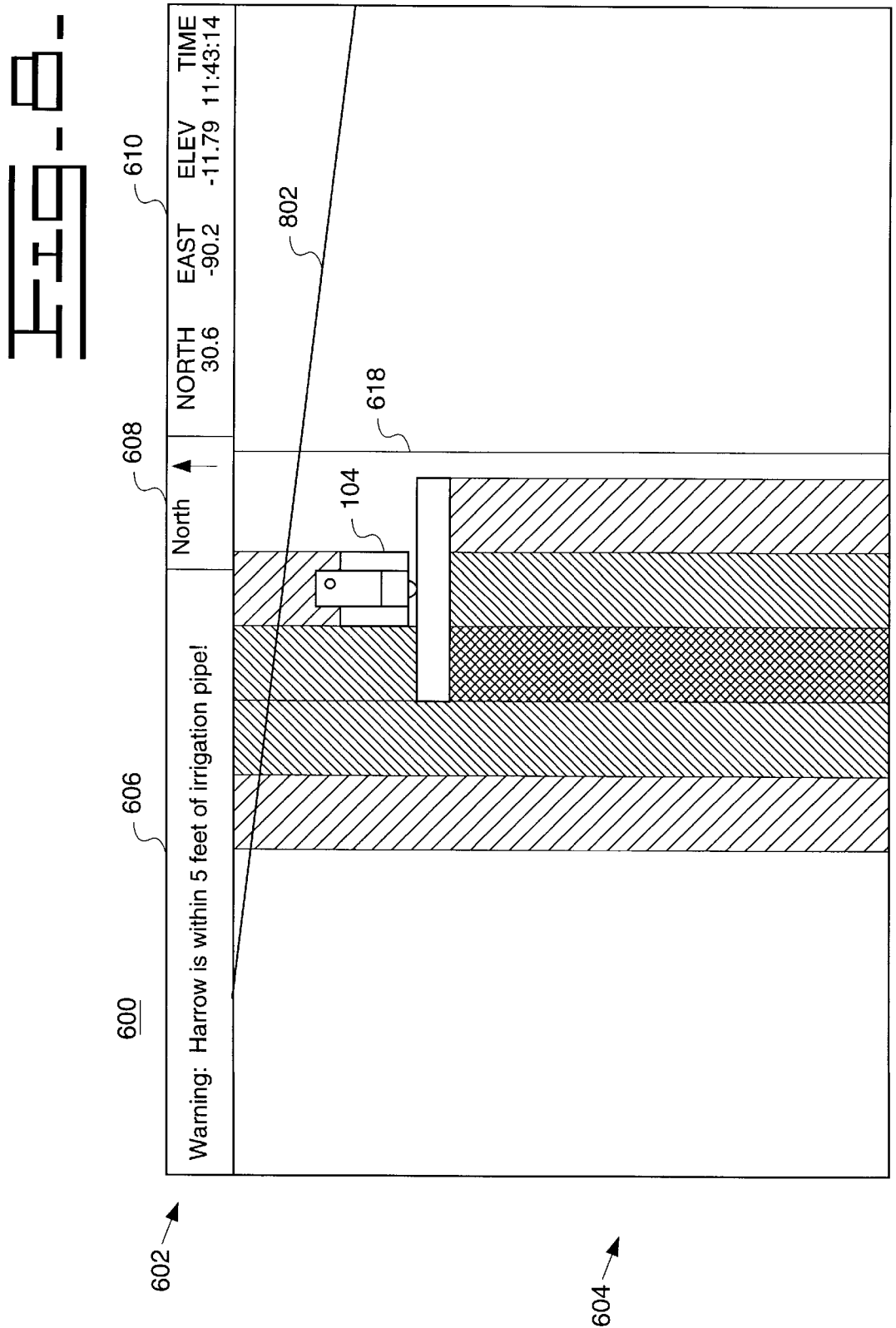

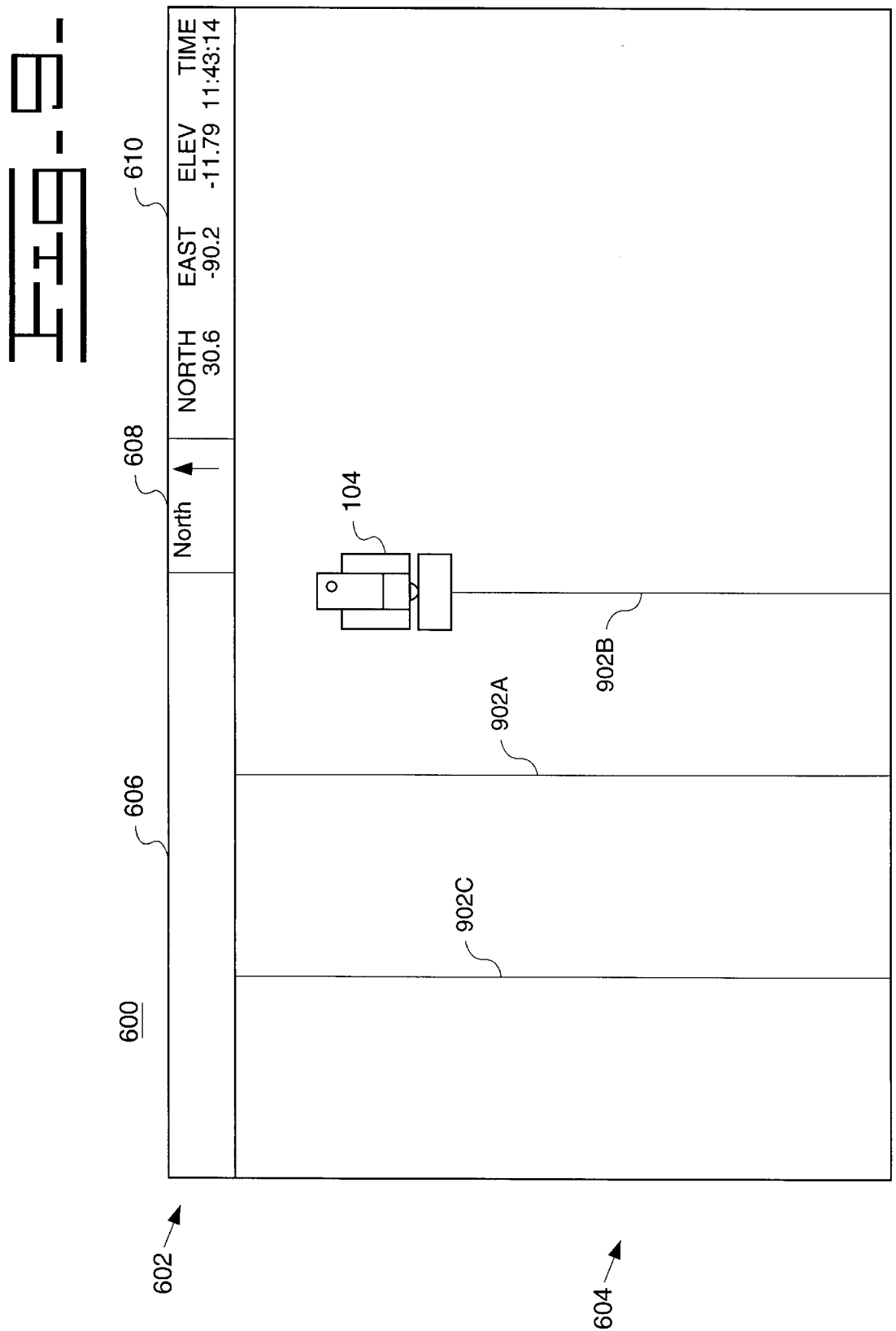

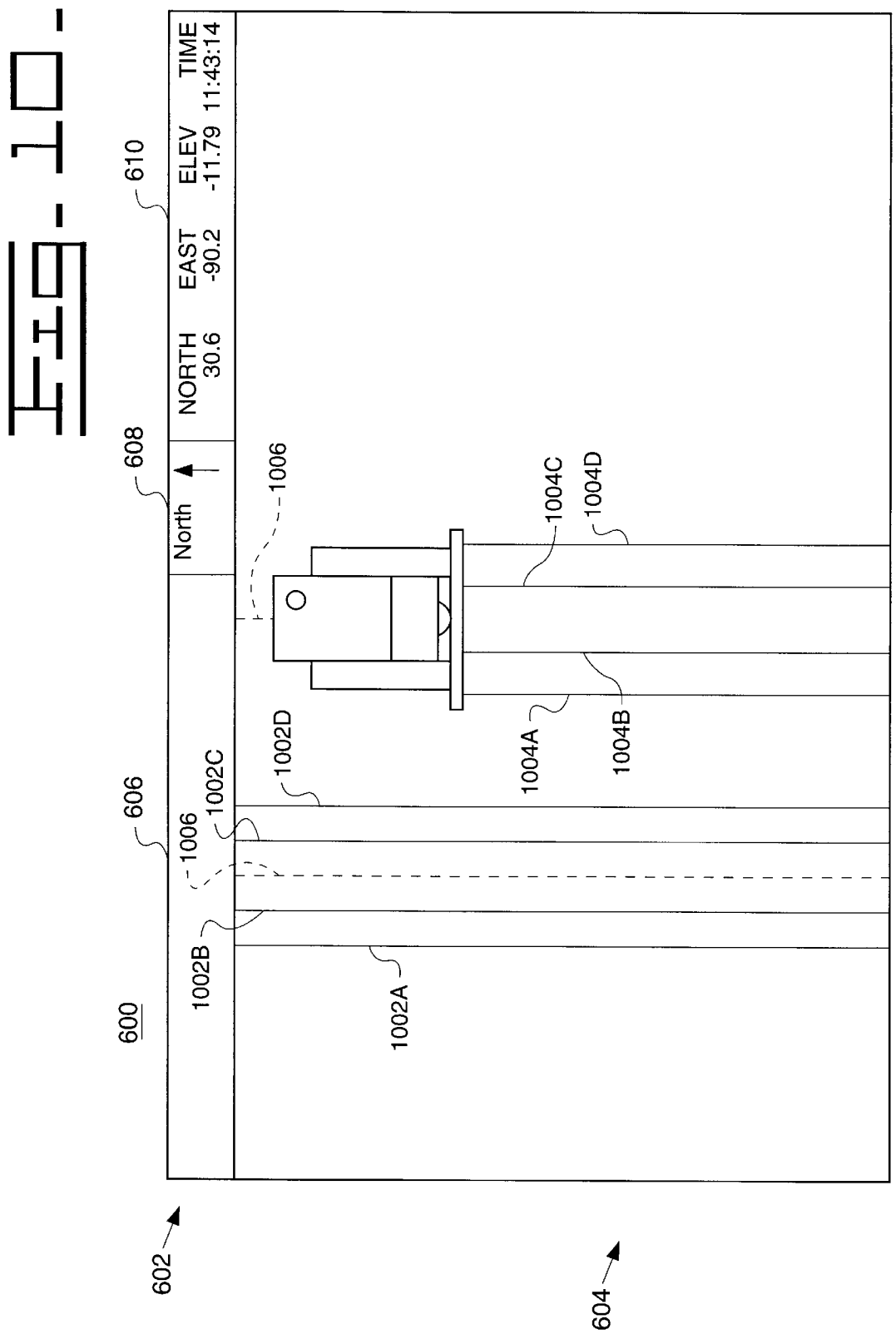

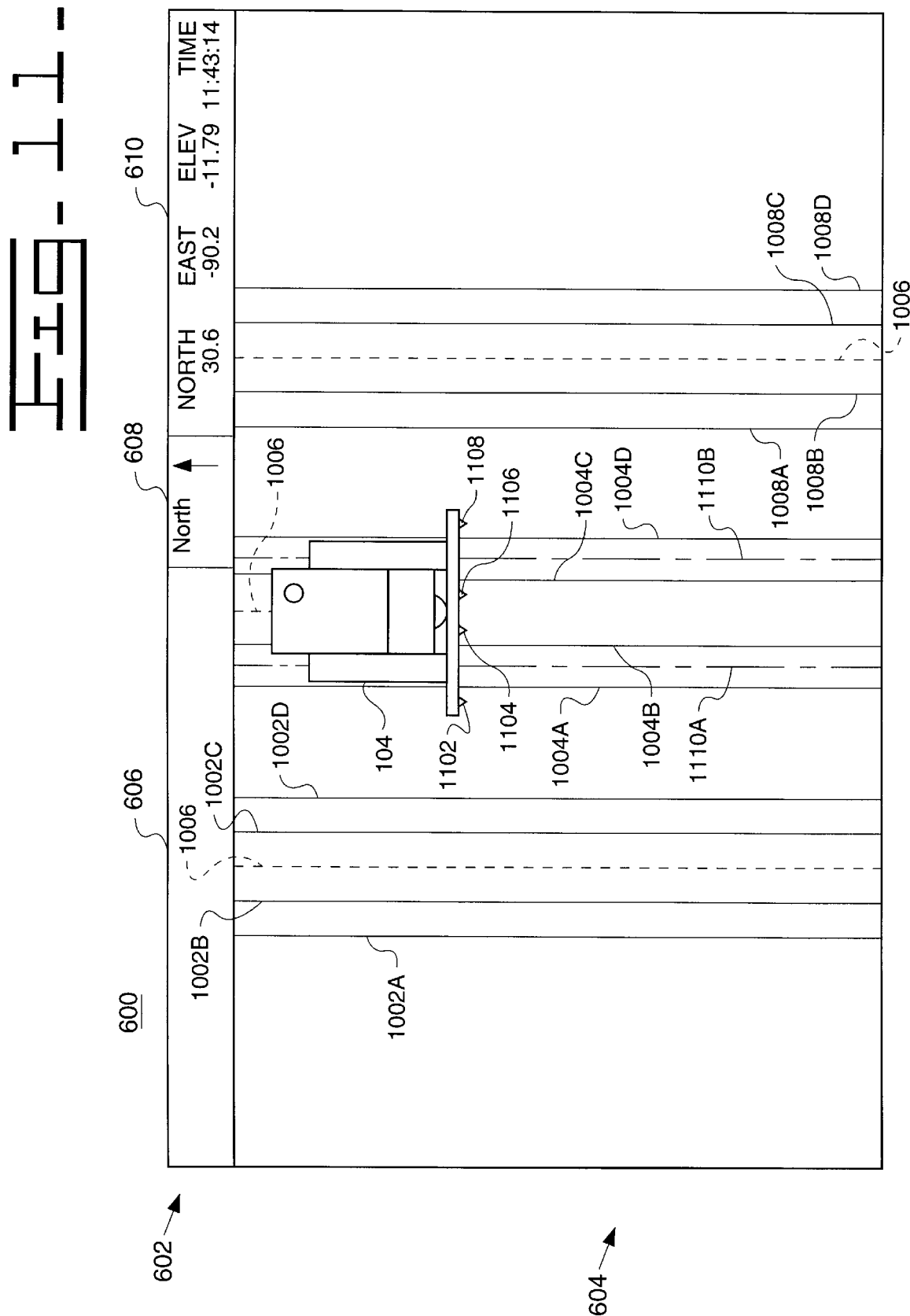

Fig-12-
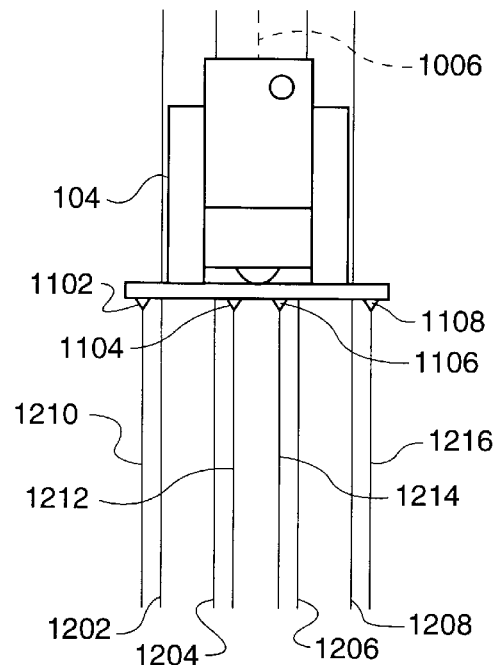
Fig-13-
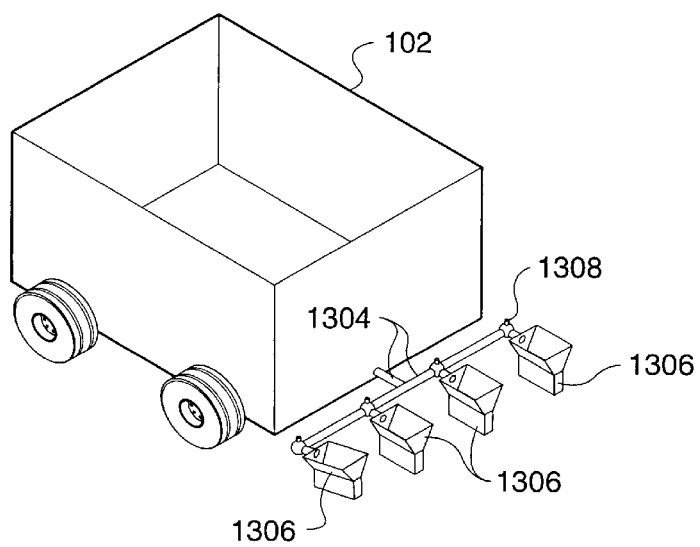

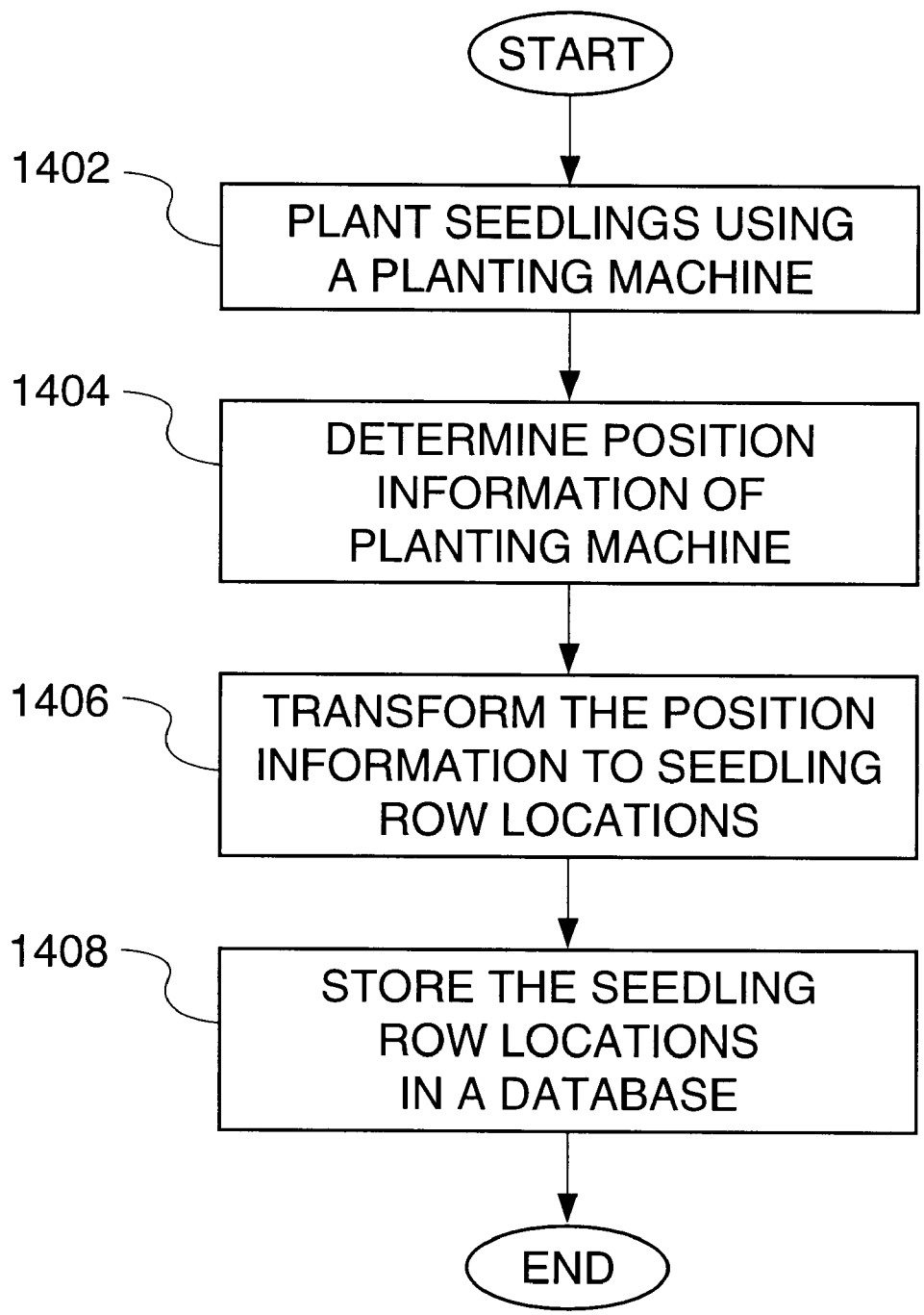
Fig_14_

Fig-16-
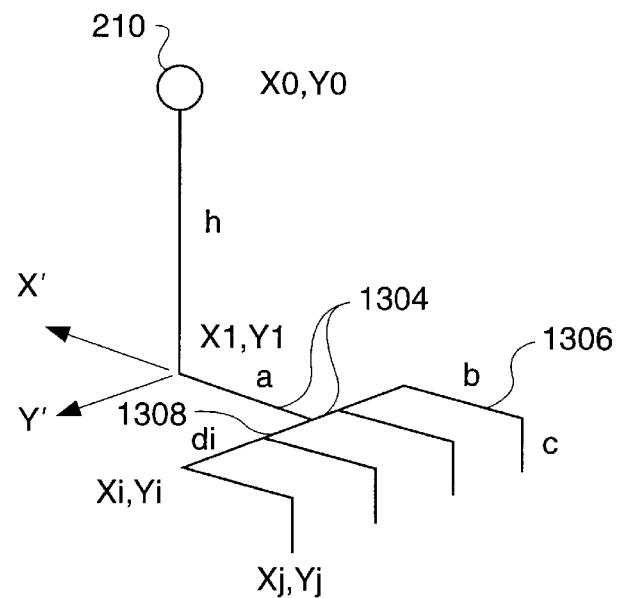
Fig-17-
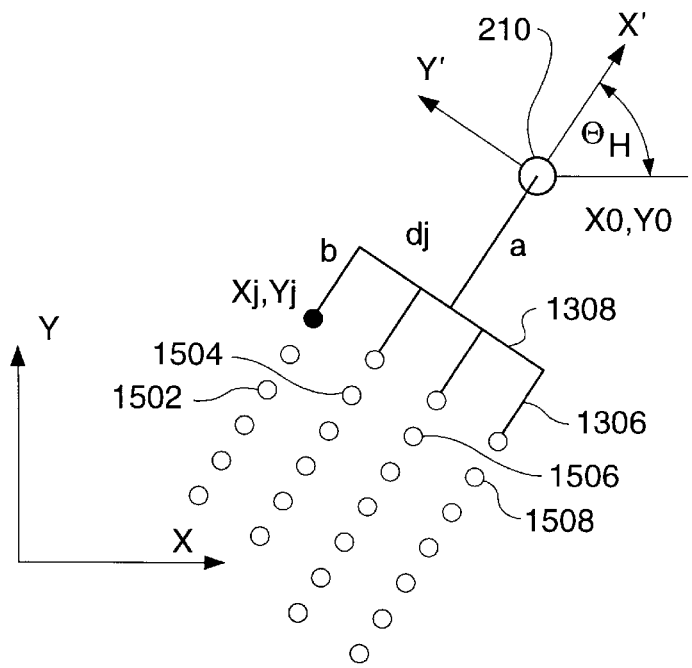

METHOD AND APPARATUS FOR DETERMINING THE LOCATION OF SEEDLINGS DURING AGRICULTURAL PRODUCTION

This application is a continuation-in-part of U.S. application Ser. No. 08/556,343, filed Nov. 13, 1995, now abandoned.

TECHNICAL FIELD

This invention relates generally to a method and apparatus used in agricultural production, and more particularly, to an apparatus and method for determining the location of seedlings planted during agricultural production.

BACKGROUND ART

The production of sugar cane presents certain unique problems. To plant a new field today, the ground is prepared by initially breaking up the ground using a tractor with a ripper attachment, harrowing or leveling, and marking the ground for a planting machine to follow. The planting machine is generally a modified tractor with seedling and drip line laying attachments. The seed and drip line laying attachments may be pivotally attached to the machine such that the attachments may move laterally relative to the machine as the machine traverses the field. Specifically, a seed laying attachment includes one or more seed heads. The seed heads are pivotally attached to the seed laying attachment. The seedlings being planted are dispensed onto the ground through the seed heads. Drip lines are buried 1–3 inches below the surface between rows of plants and are used to deliver water and fertilizer to the plants. The seedlings are then covered with a thin layer of soil. To ensure the proper amount of water reaches the seedlings from the drip lines, a ripper shank is used to break up the hard pan to allow the water to drain away from the roots. Hard pan is hard soil that may lay several inches up to several feet below the surface. If the hard pan is not broken up, the water will accumulate on top of the hard pan and cause the roots to rot.

The field is then watered and fertilized via the drip lines and generally maintained for a period of two years before the initial harvest. Four months before harvest, the sugar cane plants are sprayed with a defoliant and the plants are no longer watered. The plants become stressed and begin ramping up sap production. The sap contains a high concentration of sugar. The leaves of the plants dry up while the stalks are filling with sap. The field is then burned to eliminate the bulk of the leaves, i.e., the non-sugar containing mass. This makes processing more efficient. The stalk which contains the sap is generally unaffected by the fire.

After the fire, the remaining plant stalks are dozed into wind rows by a harvesting machine. For example, a harvesting machine may include a tractor with a multi-shank rake attached to the front. The sugar cane stalks are intertwined and practically cover the ground, making identification of the original plant rows nearly impossible. By dozing, and then raking the field to harvest the stalks, the roots of the plant may become uprooted. Thus, the field may require partial replanting. To reduce the risk of uprooting, the harvesting machine is operated at a 45° angle from the plant rows. This reduces the number of uprooted roots (root balls) but does not eliminate the problem.

Loading machines, for example modified hydraulic excavators with logging and grappling attachments, are then used to load the wind rows into haulage machines for transport.

After harvest, the sugar cane plants will normally grow back. However, if some roots or root balls were pulled out of the ground, the field may need to be partially replanted. Additionally, new drip lines will need to be laid because they are burned. However, immediately after harvest it is difficult to see the locations of the plant rows. Typically, laying of the drip lines is delayed 4–6 weeks until new plants begin to emerge, which allow the row locations to be seen.

Unlike a field such as a rice field, the terrain covered by the planting machine is not flat. A rice field is flat in order to provide proper irrigation when the fields are flooded. In contrast, a sugar cane field is not flat. There are several issues associated with developing a sugar cane field that are not addressed when a rice field is developed, because the sugar cane field is not flat. Guiding the harvesting or ripping machine along the same path that the planting machine traversed, without knowing the location of the seedlings, is not an adequate solution. A row of seedlings do not inherently lie in a straight line, and do not inherently follow the path of the planting machine. For example, the location of seedlings may deviate 3 to 6 inches from side to side, within a row. Deviations may occur for example, if the planting machine traverses a rock causing the body of the machine to pitch or tilt. The positioning system of the machine, such as a GPS antenna, will tilt with the machine. However, because the seed heads are pivotally attached the body of the machine, the position of the seed heads may not change relative to the ground. The database containing the path of the machine would indicate a change in direction, or location of the machine which is not accurate. A seed head may also encounter a rock which causes the seed head to pivot to one side temporarily. Therefore the position of the row of seedlings has changed relative to the path of the machine. Therefore simply using the path traversed by the planting machine is inadequate to determine the location of the seedlings.

If the location of the row of seedlings is known, then a cutting machine can be used instead of a push dozer, to detach the stalk from the plant seedlings. A cutting machine will reduce the number of root balls that were uprooted during harvesting. Additionally, the length of time the seedlings have been planted may be taken into account to predict the size of the rootballs. As the rootballs grow over the years, the placement of the groove cut by the ripper shank may be adjusted to account for the size of the root ball.

The present invention is aimed at solving one or more of the problems as set forth above.

DISCLOSURE OF THE INVENTION

In one aspect of the present invention, an apparatus for determining the location of rows of seedlings planted during agricultural production is provided. The apparatus senses the position of a planting machine 102 during a planting operation. The apparatus transforms the planting machine position to seedling row locations and creates a database of the locations.

In another aspect of the present invention, a method for determining the location of row of seedlings planted during agricultural production is provided. The method includes the steps of planting seedlings using a planting machine, sensing the position the planting machine and transforming the machine position to seedling row locations.

BRIEF DESCRIPTION OF THE DRAWINGS

FIG. 6 is an illustration of a display screen during a harrowing operation, according to an embodiment of the present invention;

FIG. 7 is an illustration of a zoomed in display screen during a harrowing operation, according to an embodiment of the present invention;

FIG. 8 is an illustration of a second zoomed in display screen during a harrowing operation, according to an embodiment of the present invention;

FIG. 9 is an illustration of a display screen during a marking operation, according to an embodiment of the present invention;

FIG. 10 is an illustration of a display screen during a planting operation, according to an embodiment of the present invention;

FIG. 11 is an illustration of a display screen during a ripping operation, according to an embodiment of the present invention;

FIG. 12 is a diagram illustrating determination of a desired path, according to an embodiment of the present invention;

FIG. 13 is an illustration of one embodiment of planting machine having a seed laying attachment and four seed heads;

FIG. 14 is a flow diagram detailing the apparatus of FIG. 1;

FIG. 16 is an schematic of a planting machine;

FIG. 17 is an illustration of schematic of a planting machine in a site coordinate system;

BEST MODE FOR CARRYING OUT THE INVENTION

Figure 1:
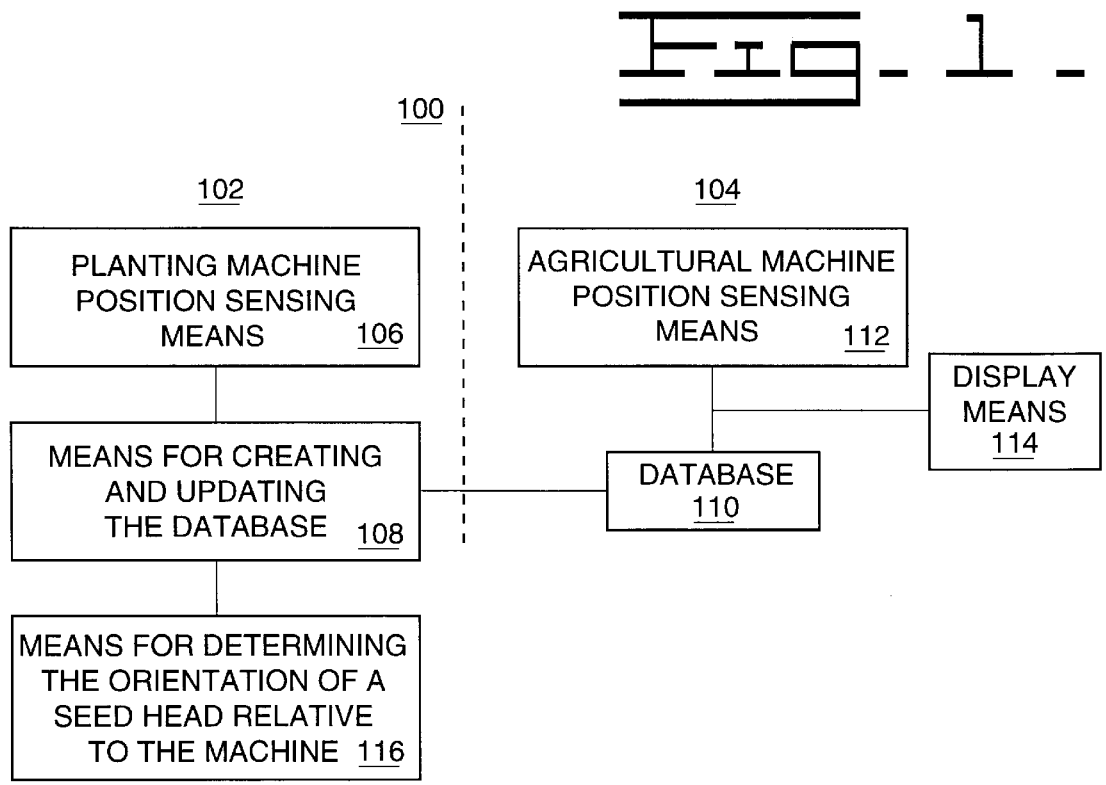
FIG. 1 is a block diagram of an apparatus for determining the location of rows of seedlings planted during an agricultural process, according to an embodiment of the present invention.

With reference to FIG. 1, the present invention provides an apparatus 100 and method for determining the location of seedlings planted during agricultural production. The apparatus 100 is partially located on a planting machine 102 and partially located on an agricultural machine 104. The agricultural machine 104 may be any of a number of different agricultural machines, e.g., another planting machine, a marking machine, or a ripping or harrowing machine.

The machine 102 may be either a plant or seed laying machine or a cover machine. A seed laying machine is adapted to plant seedlings which is defined as including seeds, plants, stalks and the like. A rootball is a seedling that has been planted and grown. A cover machine is adapted to cover seedlings with a layer of soil.

A means 106, located on the planting machine 102, senses the position of the planting machine 102 during a planting operation and responsively produces position information signals. In the preferred embodiment, the planting machine position sensing means 106 includes a Global Positioning Satellite (GPS) System 202, illustrated in FIG. 2, which receives signals from a number of GPS satellites and determines position using triangulation. In the preferred embodiment, the position includes a northing and easting location and elevation. In the preferred embodiment the means for sensing the position of the planting machine 106 also includes means for determining the orientation of the machine 102, such as tilt, pitch, and yaw sensors (not shown).

A means 108, located on the planting machine 102 receives the position information signals, responsively transforms the position information signals to seedling row locations and responsively constructs a database 110 of the seedling locations.

In the preferred embodiment the apparatus also includes a means 116, located on the planting machine 102 that determines the location of the seedlings in rows, relative to the machine 102. FIG. 13 illustrates one embodiment of a planting machine 102. The planting machine 102 includes a seed laying attachment 1304. The seed laying attachment 1304 has one or more seed heads 1306 attached to it. In the preferred embodiment, the seed heads 1306 are pivotally connected to the seed laying attachment 1304 using a pivotal joint. A sensing means 1308, such as a rotary sensor, senses the orientation of the seed heads 1306 relative to the seed laying attachment 1304, which is fixed to the body of the planting machine 102. Therefore, the sensing means 1308 senses the orientation of the seed heads relative to the planting machine 102. The seed head orientation means 116 delivers a seed head orientation signal to the database update means 108. In the preferred embodiment the database update means 108 uses the seed head orientation signal to transform the position information signal to seedling row locations.

Figure 2:
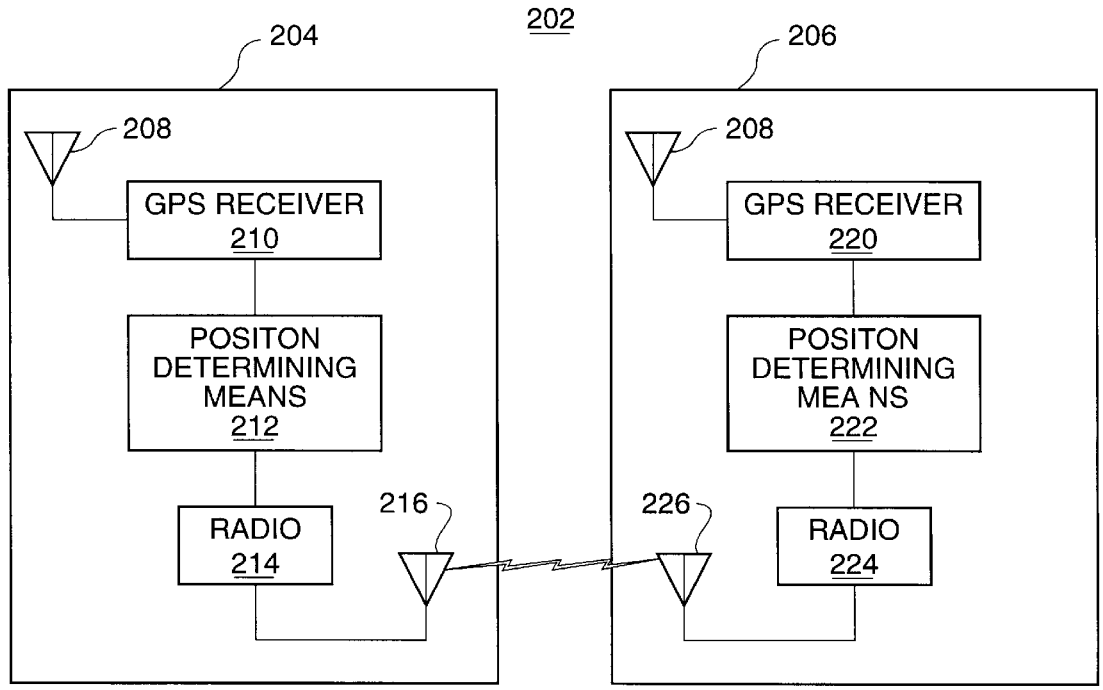
FIG. 2 is a more detailed diagram of a portion of the apparatus of FIG. 1.

With reference to FIG. 2, the GPS system or position sensing means 202 preferably includes a machine GPS means 204, located on the planting machine 102 and a reference GPS means 206 located at a reference station having a known position.

The machine GPS means 204 includes a GPS antenna 208 and a GPS receiver 210. A machine radio 214 and machine radio antenna 216 communicates with a reference radio 224 and reference antenna 226. The reference GPS means 206 also includes a reference GPS antenna 218 and a reference GPS receiver 220. The reference GPS means 206 is used to improve position determinations of the planting machine 102 using differential, or RTK GPS techniques.

The machine GPS means 204 includes a machine position determining means 212 which uses position information from the machine GPS receiver 210 and the known position of the reference station and/or the correction information from the reference station to determine the position of the planting machine 102.

Referring again to FIG. 1, in the preferred embodiment, the database update means 108 receives the position information signals and seed head orientation signals, transforms the signals to plant seedling locations, and creates and updates a database 110 of the seedling locations. The database 110 may also include the route of the planting machine 102, and landmarks such as obstacles, roads, risings and/or water mains. The database 110 on the agricultural machine 104 is updated through any available means, e.g., floppy disks, radio, PCMCIA, etc.

A means 112, connected to the agricultural machine 104, senses the position of the agricultural machine 104 and responsively produces an agricultural machine position signal. In the preferred embodiment, the agricultural machine position sensing means 112 includes a GPS system 202, as shown in FIG. 2.

In the preferred embodiment, a means 114, connected to the agricultural machine 104, and the database 110, receives the agricultural machine position signal and responsively displays to an operator of the agricultural machine 104 the position of the agricultural machine 104, the location of the seedlings in rows, and the information contained in the database 110.

In one embodiment, a comparison means 1902, connected to the agricultural machine 104, receives the agricultural machine position signal, and retrieves the location of the rows of seedlings from the database 110, and responsively compares the machine position to the location of the rows of seedlings. As will be described below, the comparison between the machine position and seedling locations may be used to guide, or position, the machine, or to position tools attached to the machine, such as a ripper attachment. A ripper attachment includes at least one ripper shank.

In the preferred embodiment, the means 106, 108, 112, 116, 212, 222 and database 110 are implemented using at least one microprocessor-based control module.

The present invention may also be described as a method for determining the location of seedlings planted during agricultural production. The method includes the steps of planting seedlings in rows using a planting machine, sensing position information of the planting machine during the step of planting, responsively transforming the position information to seedling row locations, and storing the plant seedling row locations in a database.

In the preferred embodiment, the method further includes the steps of sensing the position of an agricultural machine during an agricultural process and displaying the position of the agricultural machine 104, the location of seedlings, and the information contained in the database 110 to an operator of the agricultural machine during the agricultural process.

Referring to FIG. 14, a portion of the operation of the present invention will now be discussed. The flow diagram illustrates the operation of the planting machine 102.

In a first control block 1402 plant seedlings are planted in rows by a planting machine 102. In the preferred embodiment, the planting machine 102 has a seed laying attachment 1304 connected to the machine, as shown in FIG. 13. The seed laying attachment 1304 has one or more seed heads 1306 attached to it. In the preferred embodiment, the seed heads 1306 are connected to the seed laying attachment 1304 using a pivotal joint. As the machine 102 traverses the field, the seedlings are delivered from a bin (not shown) on the planting machine 102 to the seed heads 1306. The seedlings pass through the seed heads 1306 into the ground forming rows. One of the important objectives of the present invention is to determine the location of the rows of seedlings. Knowing the location of the rows of seedlings is important so that the related irrigation and harvesting activities do not damage or uproot the seedlings.

Figure 15:
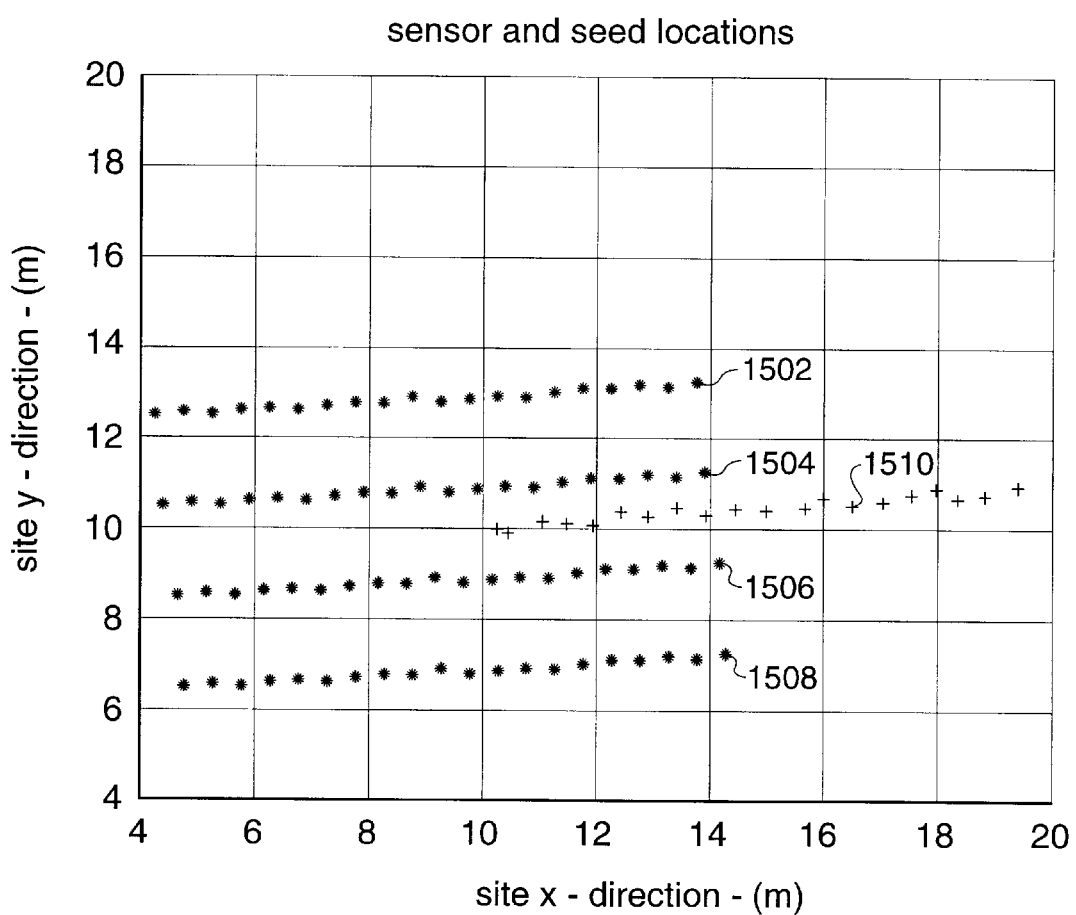
FIG. 15 is an illustration of four rows of seedlings, and the associated path of the GPS receiver.

The terrain covered by the planting machine 102 is not flat. The machine 102 will experience changes in terrain that will cause it to pitch and tilt. The seed heads 1306 may remain in contact with the ground and pivot on the seed laying attachment 1304 of the machine 102. A rock or hard entity may displace a seed head 1306 through an angle and cause a seed head 1306 to yaw momentarily relative to the machines direction of travel, displacing the placement of the seedlings from the travel direction of the machine 102. If the seed head 1306 encounters an obstacle, the head 1306 will pivot to one side or the other of the obstacle. There may be seedlings passing through the head 1306 as the head 1306 pivots. Therefore, a row of planted seedlings does not inherently form a straight line, and the row of seedlings is not inherently parallel to the path of the machine 102. Additionally, if more than one row of seedlings is being planted at a time, the rows being planted are not inherently parallel with each other. Additionally, if the machine 102 itself encounters a rock the machine 102 will tilt to one side. As the machine tilts the GPS antenna 208 will translate, or change position, causing an erroneous determination of the position of the machine 102 if unaccounted for. If the machine 102 tilts during there is an apparent shift in the actual position of the machine 102 and the actual position of the seed heads. However, as the machine 102 is tilting, a seed head 1306 may pivot and maintain its position relative to the ground. Because of these types of issues, a row of seedlings does not inherently form a straight line, and the row does not inherently run parallel to the actual or measured path of the machine, as illustrated in FIG. 15. A row of seedlings may have three to six inch location deviations from side to side. FIG. 15 illustrates an example of four rows of seedlings 1502, 1504, 1506, 1508 being placed by a machine 102 having a GPS receiver location indicated by the path 1510. The resolution of the stored rows and stored machine path is dependent upon the sampling rate (or position update rate) of the positioning means 106.

Without any transformations at all to account for the tilt, pitch, or yaw of the machine 102, the GPS receiver location indicated by the path 1510 will become the measured path of the machine 102. A six inch lateral deviation within a row of seedlings, as illustrated in FIG. 15, if not accounted for, may damage the seedlings and/or rootballs during the harvesting and ripping activities.

Referring again to FIG. 14, in a second control block 1404 position information of the planting machine 102 is determined using the planting machine position sensing means 106. In a third control block 1406 the machine position information is transformed to seedling locations.

The location of the rows of seedlings may vary relative to the path of the machine 102, therefore, using a predetermined offset of the GPS antenna position to determine the location of the rows of seedlings is inadequate. In the preferred embodiment, A transformation is performed to determine the location of the seedlings on the field. In the preferred embodiment the transformation is based on position updates of the machine 102 and the orientation of the seed heads 1306 relative to the machine 102. The orientation of the seed head 1306 may be determined based on the output of the rotary sensor 108. Based on the orientation of the seed heads 1306, the position of the machine may be transformed to determine the location of the row of seedlings.

In one embodiment, tilt and pitch sensors are used to determine the machine deviation from vertical. In the embodiment, the tilt and pitch sensors may be included in the position sensing means 106. Additionally, rotary sensors are used for each of the seed heads 1306, of the seed laying attachment 1304, for determining the orientation of the seed head 1306 relative to the machine 102. A heading angle may be determined by differentiating successive GPS position signals, or a separate heading sensor (not shown) may be used. From these sensor inputs, the position of the GPS receiver may be determined and transformed to determine the location of the seedlings being planted. The machine 102 geometry is shown schematically in FIG. 16, where (X',Y')

indicates a local coordinate system. In addition, Xi,Yi indicates the location of the attachment of the seed head 1306 to the seed laying attachment 1304. X0,Y0 indicates the location of the GPS antenna. The machine 102 illustrated in FIG. 16 includes a GPS receiver 210, a seedling attachment 1304, and seed heads 1306. A site coordinate system, (X,Y) may be defined which will be placed relative to a given field or set of fields, as shown in FIG. 17. FIG. 17 illustrates a typical field with the planting machine 102 and four rows of planted seedlings 1502, 1504, 1506, 1508. The heading angle $\Theta_h$ indicates the direction of the path traveled by the planting machine relative to the site.

One embodiment of transforming the position of the GPS receiver to the location of the seedlings in the rows includes: receiving the position signal, sensing the pitch and tilt angles of the machine 102, determining the heading of the machine 102, and determining the orientation of the seed heads as given by rotary sensors, and applying a sequence of coordinate transformations that provide the location of the seedlings relative to a site coordinate system. In the preferred embodiment, the transformation includes the effects of pitch, tilt, heading, GPS reading of the machine 102, and yaw of the seed heads are taken into account.

In one embodiment, the pitch of the machine 102 is accounted for by the following matrix:

$$\begin{vmatrix} \cos(\Theta_p) & 0 & \sin(\Theta_p) \\ 0 & 1 & 0 \\ -\sin(\Theta_p) & 0 & \cos(\Theta_p) \end{vmatrix}$$

Where:

$\Theta_h$ heading angle, relative to site frame
$\Theta_p$ pitch angle (fore and aft angular motion)
$\Theta_t$ tilt angle (side to side angular motion)
$\Theta_s$ seed yaw angle relative to the machine
h height of GPS sensor above machine reference center
c height of machine reference center above ground
a x-coordinate of seed head pivot point
b x-coordinate of seed insertion point relative to seed head pivot point
$d_i$ y-coordinate of seed head pivot The tilt angle of the machine 102 may be accounted for by the following matrix:

$$\begin{vmatrix} 1 & 0 & 0 \\ 0 & \cos(\Theta_t) & -\sin(\Theta_t) \\ 0 & \sin(\Theta_t) & \cos(\Theta_t) \end{vmatrix}$$

The pitch and tilt matrix may be combined by multiplying them together, resulting in the following matrix.

$$M_{pt} = \begin{vmatrix} \cos(\Theta_p) & 0 & \sin(\Theta_p) \\ 0 & \cos(\Theta_t) & -\cos(\Theta_p)\sin(\Theta_t) \\ -\cos(\Theta_t)\sin(\Theta_p) & \sin(\Theta_t) & \cos(\Theta_p)\cos(\Theta_t) \end{vmatrix}$$

The above matrix may be simplified by using small angle approximations. Small angle approximations are appropriate because the machine 102 usually does not tilt or pitch more than 5 degrees. The following equation is the result of the small angle approximations:

$$M_{pt} \sim \begin{vmatrix} \cos(\Theta_p) & 0 & \sin(\Theta_p) \\ 0 & \cos(\Theta_t) & -\sin(\Theta_t) \\ -\sin(\Theta_p) & \sin(\Theta_t) & \cos(\Theta_p)\cos(\Theta_t) \end{vmatrix}$$

Therefore, the position of the GPS receiver relative to the origin of the machine 102 is:

$$PGPS = \begin{vmatrix} \cos(\Theta_p) & 0 & \sin(\Theta_p) \\ 0 & \cos(\Theta_t) & -\sin(\Theta_t) \\ -\sin(\Theta_p) & \sin(\Theta_t) & \cos(\Theta_p)\cos(\Theta_t) \end{vmatrix} \begin{vmatrix} 0 \\ 0 \\ h \end{vmatrix}$$

Since the position of the GPS receiver is known, the position of the origin of the machine 102 relative to the GPS receiver may be described as:

$$\begin{vmatrix} \cos(\Theta_p) & 0 & \sin(\Theta_p) & -h\sin(\Theta_p) \\ 0 & \cos(\Theta_t) & -\sin(\Theta_t) & h\sin(\Theta_t) \\ -\sin(\Theta_p) & \sin(\Theta_t) & \cos(\Theta_p)\cos(\Theta_t) & 0 \\ 0 & 0 & 0 & 1 \end{vmatrix}$$

The heading of the machine may be accounted for by a rotation matrix, and a translation may be used to place the origin of the machine relative to the site coordinate system, as shown by the following 4×4 matrix:

$$\begin{vmatrix} \cos(\Theta_h) & -\sin(\Theta_h) & 0 & X_0 \\ \sin(\Theta_h) & \cos(\Theta_h) & 0 & Y_0 \\ 0 & 0 & 1 & c \\ 0 & 0 & 0 & 1 \end{vmatrix}$$

Therefore, the position of the origin of the machine 102 in the site coordinate system may be determined by multiplying the last two matrices together, resulting in the following transformation:

$$\begin{vmatrix} \cos(\Theta_h)\cos(\Theta_p) & -\sin(\Theta_h)\cos(\Theta_t) & (\cos(\Theta_h)\sin(\Theta_p)+\sin(\Theta_h)\sin(\Theta_t)) & -h(\cos(\Theta_h)\sin(\Theta_p)+\sin(\Theta_h)\sin(\Theta_t))+X_0 \\ \sin(\Theta_h)\cos(\Theta_p) & \cos(\Theta_h)\cos(\Theta_t) & (\sin(\Theta_h)\sin(\Theta_p)-\cos(\Theta_h)\sin(\Theta_t)) & -h(\sin(\Theta_h)\sin(\Theta_p)-\cos(\Theta_h)\sin(\Theta_t))+Y_0 \\ -\sin(\Theta_p) & \sin(\Theta_t) & \cos(\Theta_p)\cos(\Theta_t) & c \\ 0 & 0 & 0 & 1 \end{vmatrix}$$

Now the orientation of the seed heads relative to the machine 102 are accounted for. Each seed head 1306 is connected to the seed laying attachment 1304 at the universal joint. Therefore the rotary sensor 1308 may be used to determine the rotation of the seed head 1304 relative to the machine 102. In one embodiment, the yaw angle of the seed head relative to the machine is sensed by the rotary sensor 1308 and used to locate the point where the seed are inserted into the ground. If there was no tilt or pitch motion by the machine 102, the seed head 1304 would remain horizontal. The deviation from horizontal may be represented by $$Z_f-c=a \sin(\Theta_p)+d_i \sin(\Theta_t).$$

Figure 18:
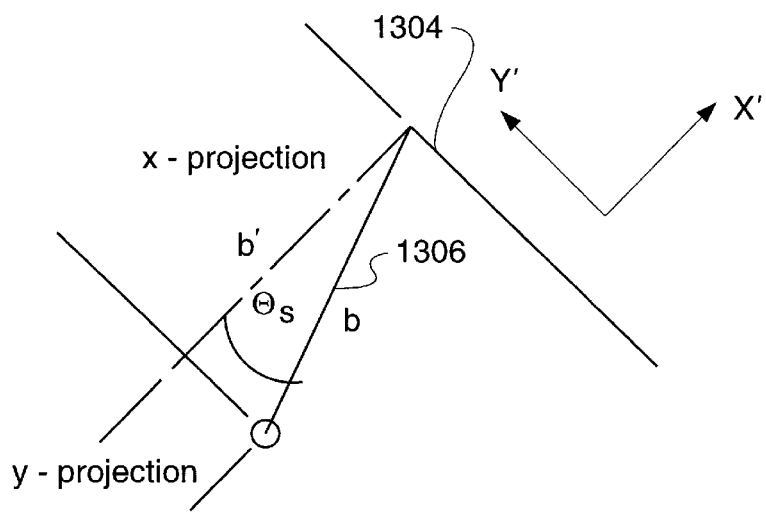
FIG. 18 is an illustration of a seed head and the associated yaw angle.
Figure 19:
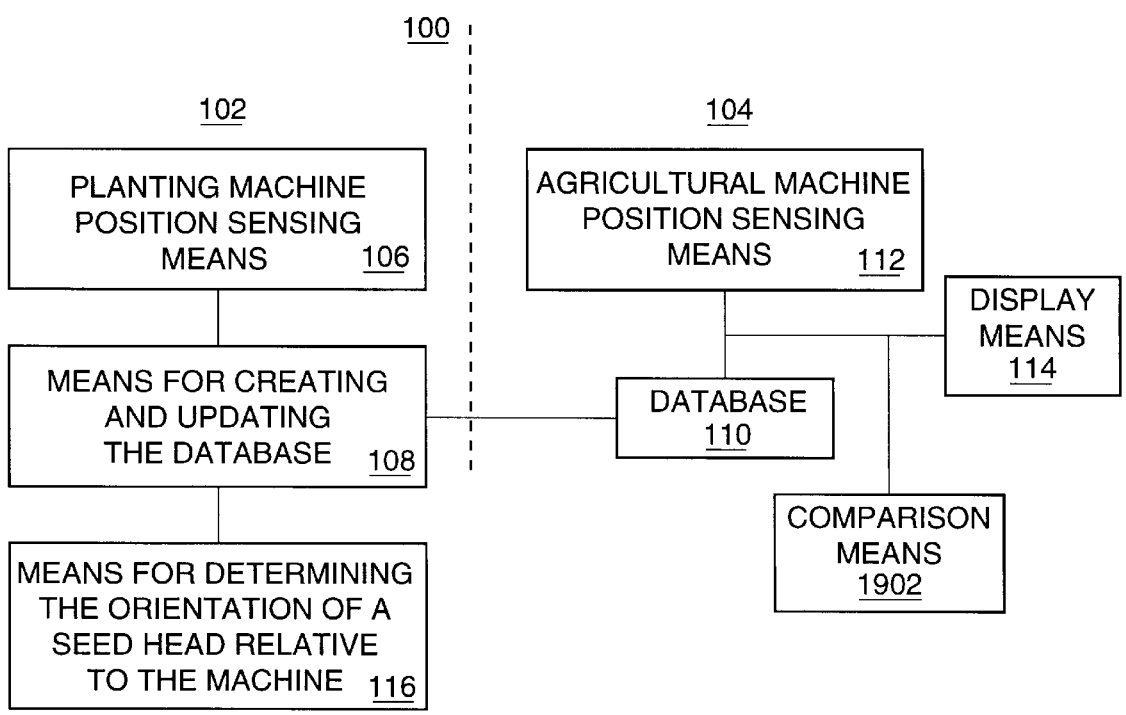
FIG. 19 is a block diagram of an apparatus for determining the location of rows of seedlings planted during an agricultural process, according to an embodiment of the present inventions.

Therefore, the horizontal projection of the seed head length, as illustrated in FIG. 18, may be calculated using the following equation:

$$b'=sqrt(b^2-(a \sin(\Theta_p)+d_i \sin(\Theta_t))^2)$$

Again it is assumed the pitch and tilt angles are small, and that b' equal b. FIG. 18 represents a seed head 1306, as seen from above, and the associated projections, where:

$$X\text{-projection}=b \cos(\Theta_s)$$

$$Y\text{-projection}=b \sin(\Theta_s)$$

Adding these projections to Xi, Yi, the location where the seed laying attachment 1304 is attached to the seed head 1306, results in the following expression:

$$Xj=(a+b \cos(\Theta_s))\cos(\Theta h)\cos(\Theta p)-(di+b \sin(\Theta_s))\sin(\Theta h)\cos(\Theta t)-h(\cos(\Theta h)\sin(\Theta p)+\sin (\Theta h)\sin(\Theta t))+X_3$$

$$Yj=(a+b \cos(\Theta_s))\sin(\Theta_h)\cos(\Theta_p)+(d_i+b \sin(\Theta_s))\cos(\Theta_h)\cos(\Theta t)-h(\sin(\Theta_h)\sin(\Theta_p)-\cos(\Theta_h)\sin(\Theta_t))+Y_0$$

Xj, Yj are the location of the seed head where a seedling will be dispensed into the ground. Therefore, Xj and Yj represent the location of the seedlings relative to the site coordinates X,Y, as illustrated in FIGS. 16 and 17. As the machine 102 traverses the field the position Xj, Yj is continuously determined, thereby determining the location of the seedlings within rows, as illustrated in FIG. 15. As described, and mathematically demonstrated above, using a mere offset from the GPS receiver is not an adequate solution to determining the location of the seedlings in rows. In the preferred embodiment, the pitch, tilt and heading of the machine 102 are accounted for, as well as the orientation of the seed heads 1306 relative to the machine 102, as illustrated in the embodiment described above.

Using the above equation, the location of the seedlings in the rows may be determined, i.e., the alignment of the rows may be determined such that static or dynamic adjustments may be made during the ripping and harvesting operation to avoid damaging the seedlings and/or rootballs within the rows.

Referring again to FIG. 14, in a fourth control block 1308, the location of the row of seedlings is stored in the database 110. In the preferred embodiment, the path of the planting machine may also be stored in the database 110, and may be used as the desired path of the harvesting machine 104.

Figure 3:
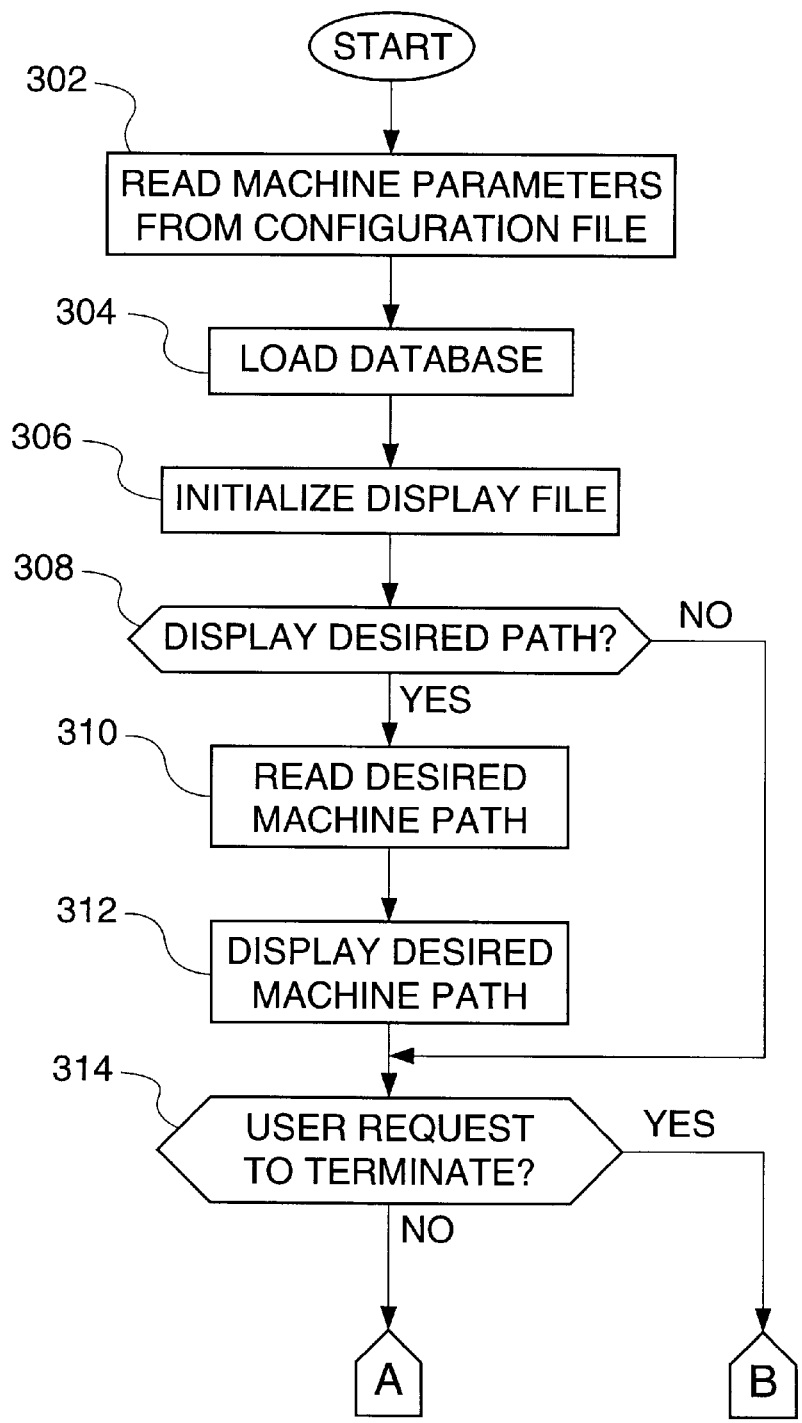
FIG. 3 is a first portion of a flow diagram detailing the operation of the apparatus of FIG. 1.

FIG. 3 illustrates a flow diagram of the operation of the agricultural machine 104. In a first control block 302, the agricultural machine's parameters are read from a configuration file. In a second control block 304, the database 110 is read. In a third control block 306, the display window is initialized.

In a first decision block 308, if the configuration file specifies that the desired path is to be displayed then control proceeds to a fourth control block 310. In the fourth control block 310, the desired path is read from the database. The desired path is displayed in a fifth control block 312. Control then proceeds to a second decision block 314.

If, in the first decision block 308, the configuration file specifies that the desired path is not to be displayed, then control proceeds to the second decision block 314.

Figure 4:
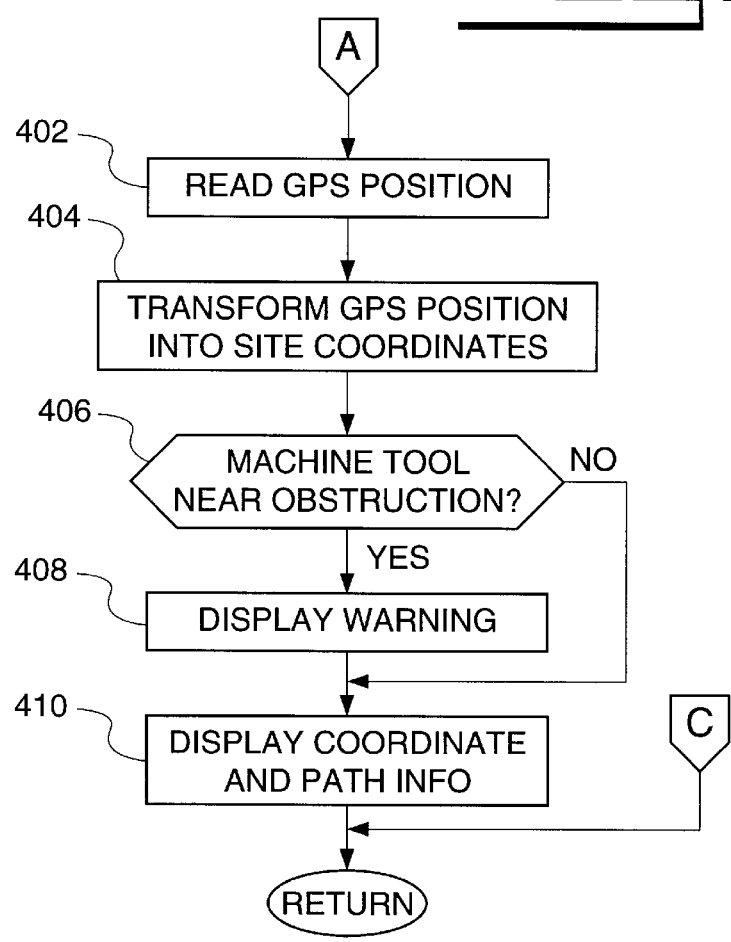
FIG. 4 is a second portion of a flow diagram detailing the operation of the apparatus of FIG. 1.

In the second decision block 314, if the operator has not requested to terminate, then control proceeds to FIG. 4. If the operator has requested to terminate, then control proceeds to FIG. 5.

Referring specifically to FIG. 4, in a first control block 402, the GPS position is read from the position sensing means 202. In a second control block 404, the GPS position is transformed into the site coordinates. Additionally, where appropriate, a transform to determine the seedling row position or tool position is performed. For example, if a ripper shank is being used to cut through the hard pan below the surface, as illustrated in FIG. 12, the location of the shank of the ripper relative to the seedling location may be determined. The rows of seedlings 1202, 1204, 1206, 1208 are shown in straight lines for exemplary purposes only. Preferably the ripper shank will cut a groove in the soil about six inches away from the row of seedlings. It is important to position the ripper shank properly in order to avoid ripping up the seedlings. Therefore the position of the ripper shank needs to account for the location of the seedlings throughout the rows. As illustrated in FIG. 12, the ripping machine may be concurrently ripping grooves 1210, 1212, 1214, 1216 for multiple rows of seedlings 1202, 1204, 1206, 1208. The location of the rows of seedlings are used to determine the proper placement of the ripper attachment. In one embodiment, the maximum lateral deviation of the seedlings that occurred within the rows during planting, is used to determine the initial position of the shanks of the ripper attachment relative to the machine 104. In an alternative embodiment, the lateral deviation of the seedlings within a row are dynamically accounted for as the machine 104 traverses the field. This may be accomplished by repositioning the machine 104, moving the ripper attachment, or manually or autonomously modifying the position of the shanks of the ripper relative to the machine 104. In one embodiment, the location of the shanks may be determined by determining the machine position and using transformations analogous to those described earlier. The location of the shanks may be compared to the stored locations of the rows of seedlings. Based on the comparison the position of the agricultural machine 102 may be modified to ensure that the shanks do not damage the seedlings. Alternatively, instead of changing the position of the agricultural machine 104, the ripper attachment, or the individual shanks of the ripper attachment may be repositioned to avoid damaging the seedlings. In the preferred embodiment the location of the machine 104, ripper attachment, shanks, and seedling rows, may be displayed to the operator. If the location of seedling rows are parallel with each other, then, even though the rows may not form straight lines, the location of the rows may be used to maneuver the ripper attachment to the proper position relative to the rows. If the rows are not in parallel with each other, then the ripper shanks may be dynamically maneuvered to obtain the proper placement of the ripper shanks relative to the location of the rows of seedlings.

Therefore, GPS position information may be transformed to determine the position of the machine 104, ripper attachment, and shanks, relative to the location of the rows of seedlings.

Additionally, the size of the seedlings root structure, i.e., the root ball, may be predicted, and used to determine the placement of the shank of the ripper attachment. The repeated harvest of sugar cane is a multi-year activity. Each year the seedlings grow in size. By the end of the third or fourth year the size of the seedlings root structure may be large enough to effect the desired placement of the ripper shank. Therefore each year, a predicted size of the seedlings root structure may be determined. The predicted seedling size may then be used to determine the placement of the shanks of the ripper attachment. For example, if the seedling root structure has grown two inches, then the placement of the ripper shank should be moved two inches further away from the row of seedlings to achieve the desired spacing from the seedlings.

Referring again to FIG. 4, in a first decision block 406, the position of any machine tool is compared with the position of any obstruction in the database 110. The obstructions may include infrastructure such as underground irrigation pipes and irrigation head systems. If the machine tool is within a predetermined distance of an obstruction, then a warning is displayed in an third control block 408. In a fourth control block 410, the display is updated with the seedling location information, the current position, and path information.

Figure 5:
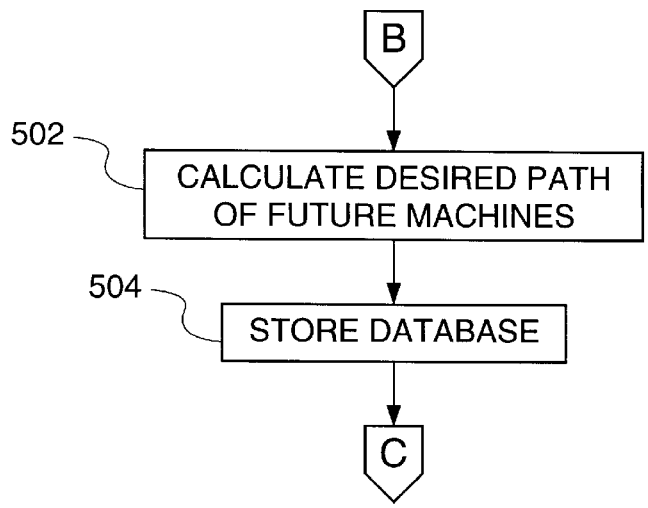
FIG. 5 is a third portion of a flow diagram detailing the operation of the apparatus of FIG. 1.

With specific reference to FIG. 5, if the operator has requested to terminate, current field data is recorded, and a future desired path is calculated in a first control block 502. In an alternative embodiment the recorded data may be processed off line to determine field development information. In an second control block 504, the database is stored and operation is terminated.

With reference to FIGS. 6–11, various display screens used with different agricultural machines are illustrated. As shown in FIG. 6, the display screen 600 generally includes a status line 602 and a display segment 604. The status line 602 includes a status segment 606 for displaying messages to the operator, an azimuth heading 608 for displaying the machine's current direction or display screen orientation, and a position and heading segment 610 for displaying the machine's location in the local coordinate system. Optionally, the position and heading segment 610 also displays the current time.

The display segment 604 is used to display the position of the machine 104, and the position, heading, and various characteristics of the current field during an agricultural process. For example, prior to any planting, the entire field is ripped and then harrowed, i.e., prepared for planting by breaking up the field. This is done during a field preparation process. As shown in FIG. 6, the position of the machine 104 is illustrated during the ripping of a first field 626. The first field 626 is surrounded by second, third, and fourth fields 628, 630, 632. The path 614 the machine 104 has followed is also displayed.

Obstructions, stored in the database are also displayed. As shown, obstructions may include a road 616, irrigation pipes 618, 620, and diversion dams 622, 624. As shown, if the ripper shank is within a predetermined distance, e.g., 5 feet, of an infrastructure or obstruction, a warning to the operator is given. The warning may include a visual and/or audible signal to the operator.

An arrow 634 may be used to indicate the current steering angle of the machine 104.

In FIGS. 6–11, like elements are similarly numbered.

With particular reference to FIG. 7, the operator may request a magnified view. As shown, the database may include a pass counter which illustrates an overlapping operation and how many passes the machine 104 has traversed a particular swath.

With particular reference to FIG. 8, the same display screen is shown as in FIG. 7. However, the status segment 606 contains an operator warning. In the example illustrated in FIG. 8, the machine 104 is close to an irrigation pipe 802.

With particular reference to FIG. 9, the display screen 600 is shown during a marker operation. During the marker operation, a small furrow may be made in the ground as a marker for the planting machine to follow. The furrows are displayed as furrow lines 902A, 902B, 902C. However, on agriculture machines having computer displays, physical markings on the ground are not needed. The path of the marking machine may be determined and stored in memory. The planting machine 102 may then display the stored path for the operator to follow. If the planting machine 102 is autonomously operated, the stored path may be delivered to a machine guidance computer program.

With particular reference to FIG. 10, the display screen 600 during a planting operation is shown. Seedling locations previously planted are stored in the database and may be displayed in rows 1002A, 1002B, 1002C, 1002D. The rows currently being planted or just planted 1004A, 1004B, 1004C, 1004D may also be displayed. The desired planting path may be displayed as a dotted line 1006. The desired planting path may be shown to help guide the operator of the machine 102 during planting. The actual path the planting machine 102 uses during planting will be stored for later use, such as during ripping and harvesting. The rows 1002, 1004 are illustrated as straight lines for exemplary purposes only. As discussed earlier and illustrated in FIG. 15, the rows of seedlings do not inherently form a straight line.

Simultaneous to the planting operation, the planting machine 102 is laying drip lines between the seed rows.

With particular reference to FIG. 11, an exemplary display screen 600 during a ripping operation after harvest and ratooning is shown. The seedlings are completely beneath the surface and therefore cannot be seen. Preferably, the agricultural machine 104 has an ripper attachment with shanks 1102, 1104, 1106, 1108. The seedling locations are displayed in rows 1002A, 1002B, 1002C, 1002D, 1004A, 1004B, 1004C, 1004D, 1008A, 1008B, 1008C, 1008D. The shanks 1102, 1104, 1106, 1108 are spaced to fit on the outsides of two adjacent rows when the agricultural machine 104 traverses between the rows. The desired path 1006 may also be displayed.

In one embodiment the agriculture machine 102 is operated autonomously. The stored location of the rows of seedlings may be used to guide the machine 104. A machine guidance means (not shown) will receive the location of the rows of seedlings, and determine a machine path through the rows that will not damage the seedlings. In addition, the stored location of rows of seedlings may be used by the machine guidance means to position a ripper attachment, or the shanks of the ripper attachment, to avoid damaging the seedlings while the machine 104 is traversing the field. For example, based on the speed of the machine 104, the position of the machine 104, the relationship between the machine 104 and the seedlings, row locations may be dynamically determined, and the position of the ripper attachment or shanks may be dynamically adjusted to track the row locations.

The ability to display the location of the seedling rows is important for an on-board operator. In the preferred embodiment, as an operator guides the machine through the field, they should be able to visually see the location of the rows relative to the machine so they may guide the machine, and associated tool attachments, through the field without damaging the seedlings. For example, when a ripper shank is being used to cut close to the seedling rows, the display will provide a visual indication of the relationship between the shanks of the ripper attachment and the seedling rows. Therefore, any necessary adjustments in machine position, ripper attachment position, or shank placement may be performed by the operator.

The above examples illustrate a few of the possible applications of the present invention. However, the present invention is not limited to such. For example, the present invention may be applied to the agricultural process of laying irrigation drip tube between the rows or guiding a shearing machine during harvesting. The display screen would be similar to the display screen of FIG. 11.

The location of the rows of seedlings may be sent from the planting machine 102 to a central control facility (not shown), and displayed for monitoring or control purposes, or later off line processing may be performed to provide data for other field machines.

INDUSTRIAL APPLICABILITY

With reference to the drawings and in operation, the present invention is adapted to determine the location of rows of seedlings planted during an agricultural operation.

A database containing the locations of seedlings, i.e., seeds, roots, rootballs, and/or plants, is compiled during the planting operation by a planting machine 102. The planting machine 102 includes a position sensing means 106 for sensing its position during the planting operation. This information is stored in the database. The database may also include other information to be displayed, e.g., the location of obstructions.

The agricultural machine 104 also includes a position sensing means 112. The database is stored on the agricultural machine 104. The information contained in the database is displayed along with the machine's position information during its operation. The agricultural process can be any process in which the locations of the seedlings is relevant, including ripping, laying irrigation lines and, additional planting.

Other aspects, objects, advantages and uses of the present invention can be obtained from a study of the drawings, disclosure and appended claims.

We claim:

1. An apparatus for determining the location of rows of seedlings planted during agricultural production, comprising:
    means for sensing a position of a planting machine during a planting operation and responsively producing position information signals;
    means for receiving said position information signals, responsively transforming said position information signals to seedling row locations and responsively constructing a database of said seedling row locations; and
    a sensing means for determining an orientation relative to the planting machine of a seed head attached to said planting machine and responsively producing a seed head orientation signal, wherein said transformation is performed in response to said seed head orientation signal and said position information signals.

2. An apparatus, as set forth in claim 1, further comprising:
    means associated with an agricultural machine, for sensing a position of said agricultural machine and responsively producing an agricultural machine position signal; and
    means for storing said database, receiving said agricultural machine position signal and responsively displaying to an operator of said agricultural machine the position of the agricultural machine relative to said seedling row locations.

3. An apparatus, as set forth in claim 2, wherein said database includes landmarks and wherein said display means further displays said landmarks.

4. An apparatus, as set forth in claim 3, wherein said display means generates a warning when the agricultural machine approaches landmarks which form obstacles.

5. An apparatus, as set forth in claim 2, wherein said said display means further display a heading of the agricultural machine.

6. An apparatus, as set forth in claim 1, wherein said sensing means for determining said seed head orientation includes a rotary sensor.

7. An apparatus, as set forth in claim 1, further comprising:
    means for determining an orientation of the planting machine, wherein is transformation is additionally performed in response to said planting machine orientation.

8. An apparatus, as set forth in claim 7, wherein said means for determining the orientation of the planting machine includes at least one of a pitch sensor, a tilt sensor, and a yaw sensor.

9. An apparatus for determining the location of rows of seedlings planted during agricultural production, comprising:
    means for sensing a position of a planting machine during a planting operation and responsively producing position information signals;
    means for receiving said position information signals, responsively transforming said position information signals to seedling row locations and responsively constructing a database of said seedling row locations;
    means associated with an agricultural machine, for sensing a position of said agricultural machine and responsively producing an agricultural machine position signal;
    means for storing said database, receiving said agricultural machine position signal and responsively displaying to an operator of said agricultural machine the position of the agricultural machine relative to said seedling row locations; and
    means for comparing said agricultural machine position to said seedling row locations, and responsively determining a position for a shank of at least one ripper attached to the agricultural machine which avoids said seedling row locations.

10. An apparatus, as set forth in claim 9, wherein said means for comparing said agricultural machine position said seedling row locations displays said position of said ripper shank relative to said seedling row locations in response to said comparison.

11. An apparatus, as set forth in claim 10, further comprising means for dynamically positioning said ripper shank relative to said seedling row locations.

12. A method for determining the location of rows of seedlings planted during agricultural production, comprising:

planting seedlings in rows using a planting machine;

sensing position information of said planting machine during said step of planting said seedlings;

determining an orientation relative to said planting machine of a seed head attached to said planting machine and responsively transforming said position information to seedling row locations; and storing said seedling row locations in a database.

13. A method as set forth in claim 12, further comprising the steps of:

sensing position information of an agricultural machine during an agricultural process; and displaying said agricultural machine position information and said seedling row locations to an operator of said agricultural machine during said agricultural process.

14. A method, as set forth in claim 13, wherein said database includes landmarks and wherein said displaying step includes the step of displaying said landmarks.

15. A method, as set forth in claim 13, wherein said said displaying step includes displaying a heading of the agricultural machine.

16. A method, as set forth in claim 13, further comprising storing a path traveled by the planting machine in said database, and wherein said displaying step includes displaying said stored path as a desired path of said agricultural machine.

17. A method as set forth in claim 12, wherein the step of transforming said position information further comprises the step of determining an orientation of said planting machine.

18. A method, as set forth in claim 17, wherein the step of determining said planting machine orientation includes the steps of determining at least one of a pitch, a tilt, and a yaw of said planting machine.

19. A method as set forth in claim 17, wherein the agricultural machine includes a ripper attachment having a shank, the method further comprising the steps of:

determining a position of the shank; and comparing said shank position to said seedling row locations.

20. A method as set forth in claim 19, further comprising the step of dynamically adjusting the position of the shank relative to the agricultural machine in response to said comparison.

21. A method, as set forth in claim 19, further comprising the step of displaying said shank position relative to said seedling row locations in response to said comparison.

* * * * *